(12) United States Patent
DiLorenzo (10) Patent No.: US 6,876,901 B2
(45) Date of Patent: Apr. 5, 2005

(54) ELECTRONIC MEDIA DISTRIBUTION SYSTEM WITH MEDIA PURCHASE INTERFACE

(76) Inventor: Mark DiLorenzo, P.O. Box 1658, Laguna Beach, CA (US) 92651

( * ) Notice: Subject to any disclaimer, the term of this patent is extended or adjusted under 35 U.S.C. 154(b) by 0 days.

(21) Appl. No.: 10/462,232

(22) Filed: Jun. 16, 2003

(65) Prior Publication Data

US 2003/0208300 A1 Nov. 6, 2003

Related U.S. Application Data

(63) Continuation-in-part of application No. 10/134,193, filed on Apr. 29, 2002, now Pat. No. 6,650,963, which is a continuation of application No. 09/724,806, filed on Nov. 28, 2000, now Pat. No. 6,438,450.

(51) Int. Cl.[7] .......................... G06F 17/00; G06F 17/60
(52) U.S. Cl. .......................... 700/231; 705/26; 700/234
(58) Field of Search ................................ 700/231, 232, 700/233, 234; 705/26, 27; 84/609, 477 R (56) References Cited

U.S. PATENT DOCUMENTS

| | | |
|---|---|---|
| 4,414,467 A | 11/1983 | Gould et al. |
| 4,528,643 A | 7/1985 | Freeny, Jr. |
| 4,553,211 A | 11/1985 | Kawasaki et al. |
| 4,905,280 A | 2/1990 | Wiedemer |
| 5,150,817 A | 9/1992 | Livingston |
| 5,219,094 A | 6/1993 | Labriola |
| 5,339,250 A | 8/1994 | Durbin |
| 5,355,302 A | 10/1994 | Martin et al. |
| 5,415,319 A | 5/1995 | Risolia |
| 5,440,336 A | 8/1995 | Buhro et al. |
| 5,445,295 A | 8/1995 | Brown |
| 5,519,435 A | 5/1996 | Anderson |
| 5,521,631 A | 5/1996 | Budow et al. |
| 5,528,282 A | 6/1996 | Voeten et al. |
| 5,629,867 A | 5/1997 | Goldman |
| 5,633,839 A | 5/1997 | Alexander et al. |
| 5,641,319 A | 6/1997 | Stoel et al. |
| 5,647,505 A | 7/1997 | Scott |
| 5,661,517 A | 8/1997 | Budow et al. |
| 5,734,719 A | 3/1998 | Tsevdos et al. |
| 5,748,485 A | 5/1998 | Christiansen et al. |
| 5,769,269 A | 6/1998 | Peters |
| 5,781,889 A | 7/1998 | Martin et al. |
| 5,794,217 A | 8/1998 | Allen |
| 5,798,785 A | 8/1998 | Hendricks et al. |
| 5,809,246 A | 9/1998 | Goldman |
| 5,831,862 A | 11/1998 | Hetrick et al. |
| 5,848,398 A | 12/1998 | Martin et al. |
| 5,945,987 A | 8/1999 | Dunn |
| 5,959,945 A | 9/1999 | Kleiman |
| 6,067,562 A | 5/2000 | Goldman |
| 6,163,795 A | 12/2000 | Kikinis |
| 6,232,539 B1 | 5/2001 | Looney et al. |
| 6,248,946 B1 | 6/2001 | Dwek |
| 6,269,394 B1 | 7/2001 | Kenner et al. |
| 6,295,555 B1 | 9/2001 | Goldman |
| 6,392,664 B1 * | 5/2002 | White et al. ................. 345/717 |
| 6,628,302 B2 * | 9/2003 | White et al. ................. 345/717 |

* cited by examiner

*Primary Examiner*—Gene O. Crawford
(74) *Attorney, Agent, or Firm*—Koppel, Jacobs, Patrick & Heybl (57) ABSTRACT

User interface systems gain access to media data stored in a database for a predetermined amount of time. Access is gained through a server that presents to the interface a selection menu for selecting media data. Upon selection of media data the server accesses the data from the database and transmits it to the user interface. The server also presents to the user interface a content history menu by which ancillary data associated with the content played by the system during the predetermined time is presented. The ancillary data may include the title of the content, the artist of the content, the availability of the content for purchase and its price, the title of one or more compilations, e.g., CDs, on which the content is contained and the availability of the compilations/CD for purchase and the price.

20 Claims, 9 Drawing Sheets

ELECTRONIC MEDIA DISTRIBUTION SYSTEM WITH MEDIA PURCHASE INTERFACE

RELATED APPLICATIONS

This is a continuation-in-part of application Ser. No. 10/134,193 filed Apr. 29, 2002, now U.S. Pat. No. 6,650,963, which is a continuation of application Ser. No. 09/724,806 filed Nov. 28, 2000, now U.S. Pat. No. 6,438,450.

BACKGROUND OF THE INVENTION

This invention relates generally to systems for, and methods of, distributing electronic media from one or more servers to one or more user devices. "Electronic media" as used within the context of this disclosure includes audio and/or video data stored in the servers in an electronic format.

SUMMARY OF THE INVENTION

Briefly, and in general terms, the invention is directed to a system for providing electronic media content to any one of a plurality of users. In one aspect, the system includes a plurality of user interfaces each having a video monitor, an input device, speakers and an interface device. The system also includes a central database and a server that interfaces the user interfaces and the central data base over communications lines. The data base stores a plurality of content. Each piece of content has ancillary data associated with it which is also stored in the database. The server is programmed to present a selection menu to the video monitor through which a compilation that includes a plurality of content in a specified order may be selected. In response to a selection of a compilation, the server presents a player menu to the video monitor through which the compilation may be played and one or more of the plurality of content may be selected for playing. The player menu also includes a link to a content history menu. In response to user interaction with the player, the serves accesses the content from the central data base and transmits it to the user interface for playing. In response to linking to the content history menu, the server presents to the video monitor a content history menu that includes data indicative of the content played and its associated ancillary data, such as title, artist, purchase availability and price.

These and other aspects and advantages of the invention will become apparent from the following detailed description and the accompanying drawings which illustrate by way of example the features of the invention.

DETAILED DESCRIPTION OF THE PREFERRED EMBODIMENTS

Figure 1:
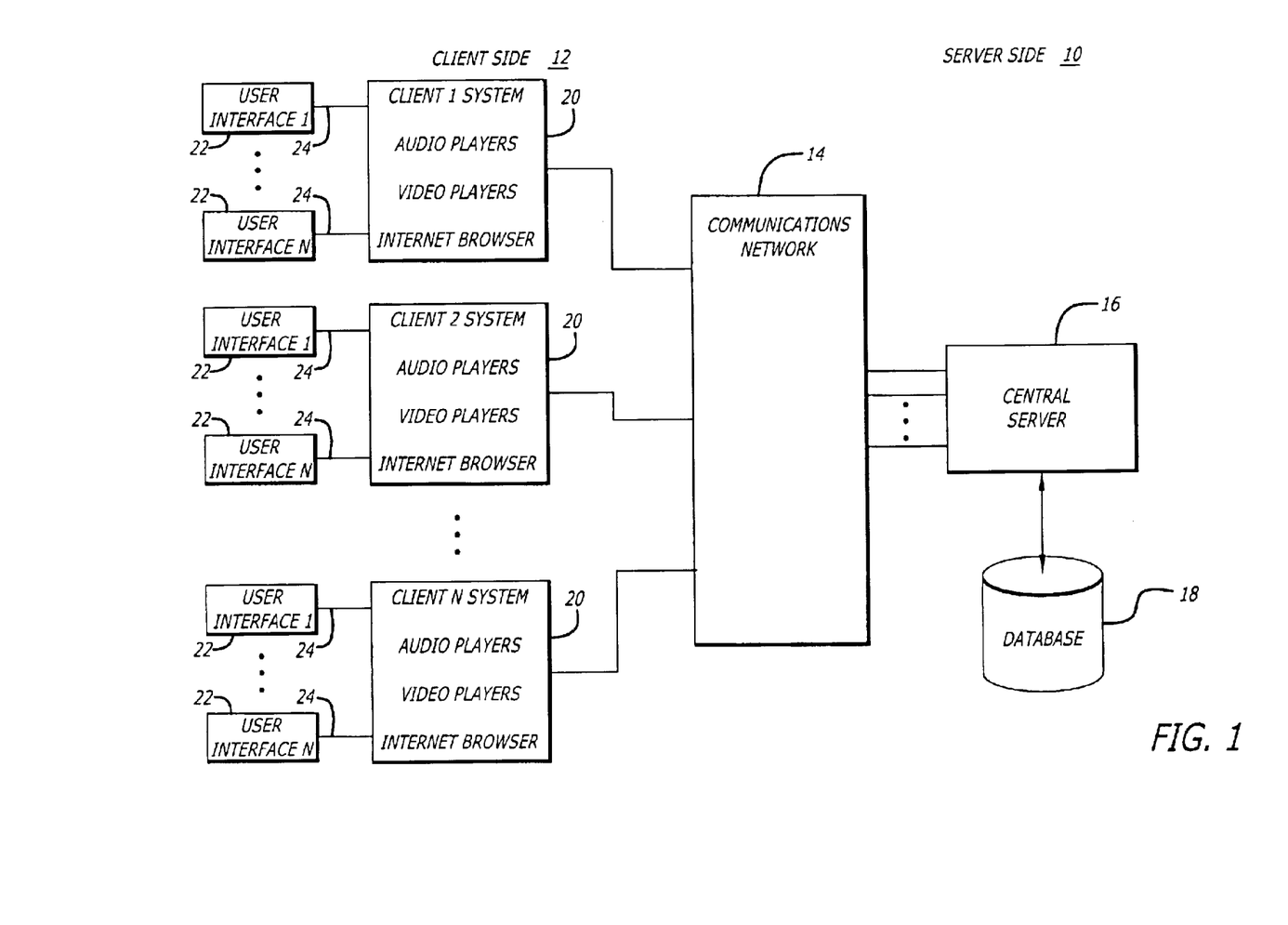
FIG. 1 is a block diagram of a multi-room entertainment system in accordance with the invention including a server side having a central server and a database and a client side having a plurality of client systems with a plurality of user interface systems.

Referring now to the drawings and particularly to FIG. 1, there is shown an electronic media distribution system configured as a client/server type network system having a server side 10 and a client side 12 interfacing through a communication network 14. The communications network 14 may be any type of network capable of transmitting electronic digital media. Examples of communications networks include the Internet, cable TV systems, satellite TV systems and RF coax systems, such as those used in the hospitality industry and described in U.S. Pat. Nos. 6,256,554 and 6,438,450, the disclosures of which are hereby incorporated by reference.

In one configuration of the system, the server side 10 includes a central server 16, such as a Linux server, and a central database 18. The central database 18 stores individual audio and/or image, e.g., still image and video, media-data files in a standard downloadable or streaming format, such as MP3 or MPEG-2. The media-data files are also referred to as "content."

Each piece of content has ancillary data associated with it, which is also stored in the data base. The ancillary data may include the title of the content, the artist of the content, the availability of the content for purchase and its price, the title of one or more compilations, e.g., CDs, on which the content is contained and the availability of the compilations/CD for purchase and the price. The artist data may include biographical information on the artist and discography information related to one or more compilations/CDs by the artist.

The client side 12 includes a plurality of client systems 20 located remote from the central server 16. In one implementation of the system one or more client systems are located in hotels within a hospitality network. Each client system 20 comprises a processor capable of launching one or more audio and/or video players and one or more Internet browsers. Each client system 20 also includes several audio/video outputs which interface with a plurality of in-room system user interfaces 22 through appropriate communications lines 24 associated with the communications system 14. Such communications lines 24 may include category twisted-pair wires, coax cable and other such lines capable of transmitting digital electronic media. In a preferred configuration, the user interfaces 22 include a video monitor, remote control, speakers and an interface device, such as a TV remote control or a computer keyboard.

Operation of the system is controlled by system software housed within the central server 16. The system software provides a graphical user interface (GUI) between system users and the system. The system software also controls the flow of data from the database 18 to the client systems 20 and the user interfaces 22. In response to user inputs entered at the user interface 22, the system software causes the central server 16 to send data or content to the client system 20 associated with the user interface. The data sent by the central server 16 may include GUI data, such as HTML interface screen data, or media data such as MP3 audio data or MPEG-2 video data. Media data is also referred to herein as media content. Once within the client system 20, the media content is sent to the appropriate user interface 22.

Figure 2:
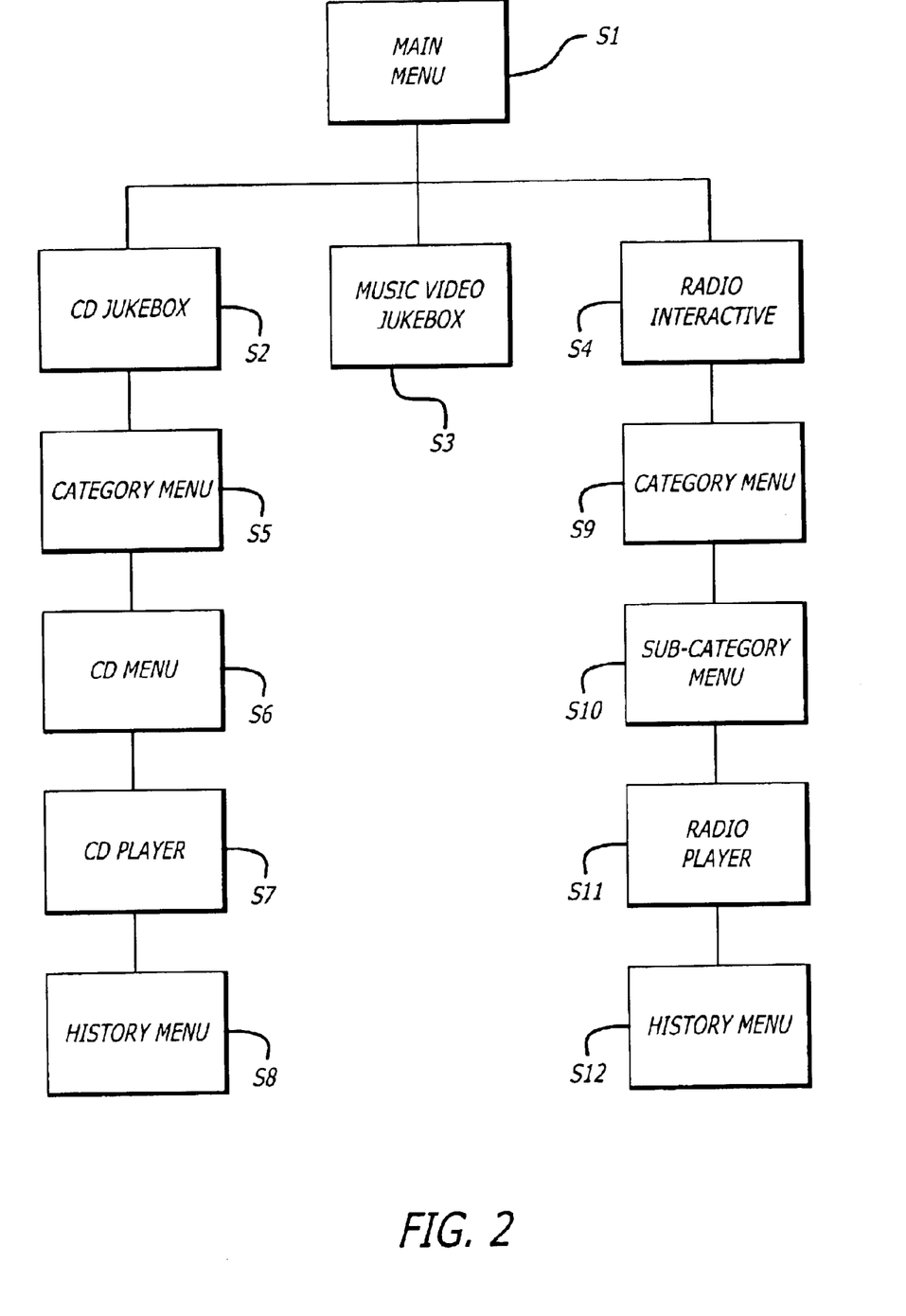
FIG. 2 is a flow chart of various modes of operation of one configuration of the system including CD Jukebox, Music Video Jukebox and Radio Interactive.
Figure 3:
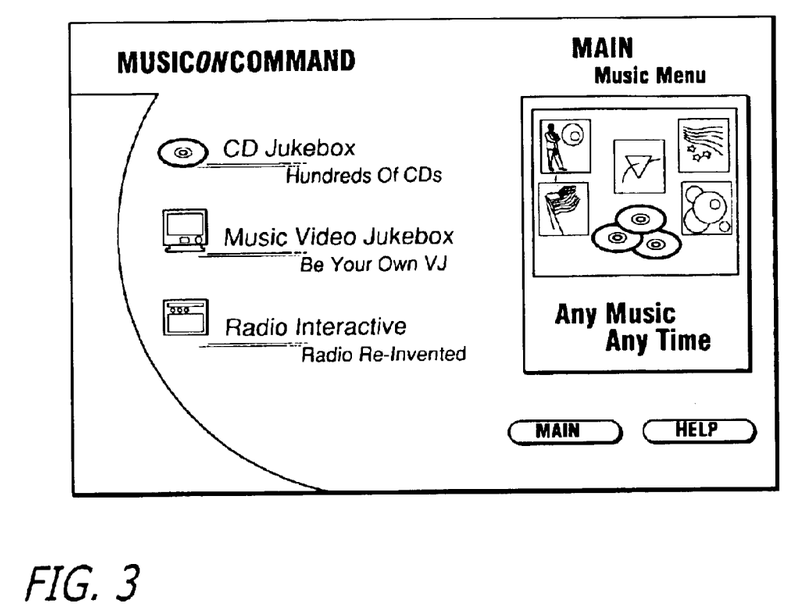
FIG. 3 is an exemplary main menu provided by the central server to the user interface through which a user may select a mode of operation.

With reference to FIG. 2, the detailed operation of the system is as follows. At step S1, a user is presented with a main activation menu screen (FIG. 3) through which he may access the system. Once the user accesses the system, the system software presents a series of selection menus through which the user may select content for playing. In one embodiment of the system, there are three aspects of the system which may be accessed by the user. These aspects include CD Jukebox S2, Music Video On Demand S3 and Radio Interactive S4.

In one configuration of the system, a time-allotted fee is associated with use of the system. In this fee arrangement, the system senses, via user menu selection, when a user interface 22 has accessed the system and presents to the user interface a fee menu through which the user may purchase access to the content within the system for a set amount of time. For example, the user may purchase system access for a two hour, twelve hour or a twenty-four hour period. During this time period, or session, the user may listen to and/or view any of the content within the system.

Once a time-allotted selection is made, the system stores information which identifies the user interface 22 making the selection and the particular selection made. This information is subsequently provided to the client system 20 associated with the user interface 22 where it is stored for billing purposes. The system may further provide a free-sample period during which a user may access the system without being charged.

In another configuration, the system may be accessed on a per media charge. For example, media data may be provided to a user interface 22 for one dollar per single media. Alternatively, a collection or compilation of media data, such as an entire CD, may be accessed for a flat fee.

Figure 4:
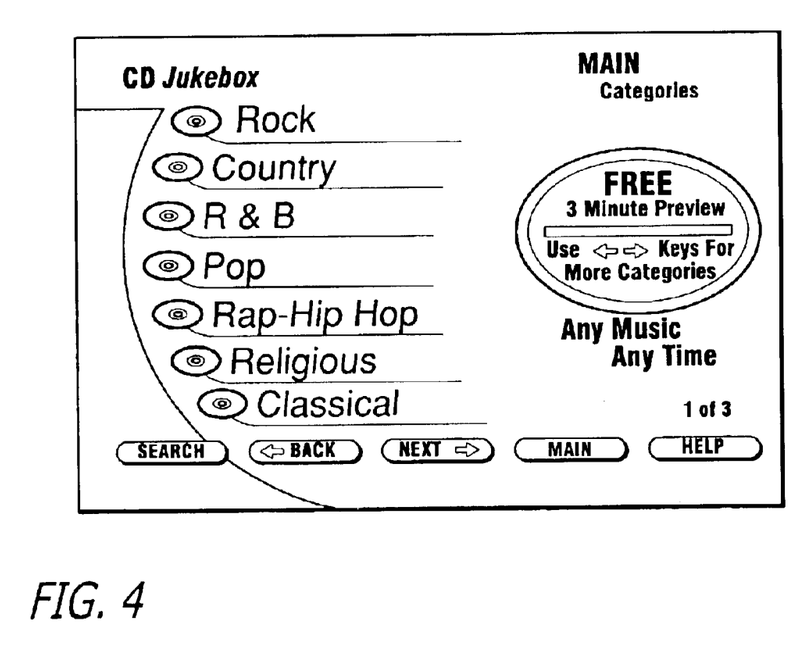
FIG. 4 is an exemplary category menu provided by the central server to the user interface upon selection of the CD Jukebox mode provided by the menu of FIG. 3.
Figure 5:
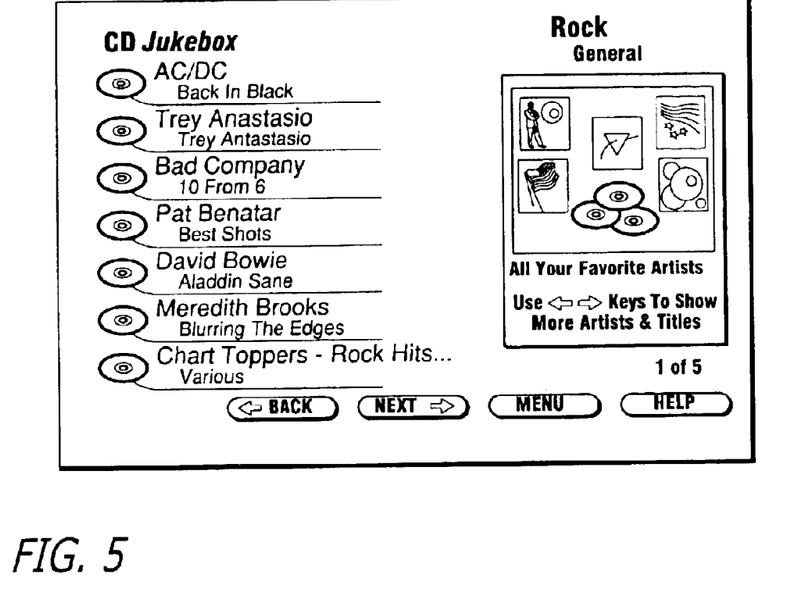
FIG. 5 is an exemplary CD menu provided by the central server to the user interface upon selection of a category from the menu of FIG. 4.
Figure 6:
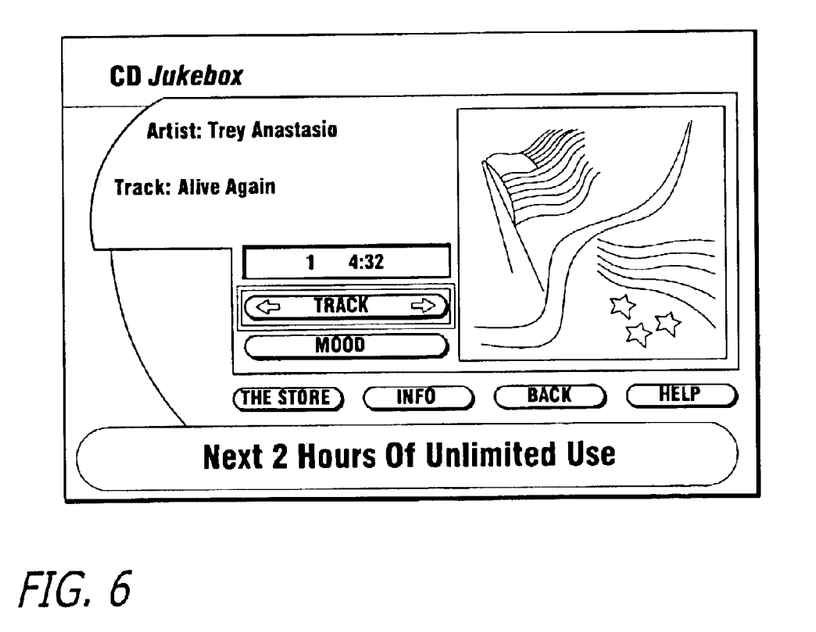
FIG. 6 is an exemplary CD player made available to the user interface upon selection of a CD from the menu of FIG. 5.

With continued reference to FIG. 2, if the user selects the CD Jukebox option, the system software sends a category menu screen (FIG. 4), to the user interface 22. At step S5, the user may select one of the categories presented. The system then sends a CD menu screen (FIG. 5) to the user interface 22. At step S6, the user may then select a CD. At step S7, the user is then presented with a CD player menu (FIG. 6).

Through the player menu the user may listen to the entire CD from the beginning. In this case, the system software causes the central server 16 to access each piece of content associated with the CD from the central database 18 and to transmit the content to the user interface 22. The server 16 is programmed to access the content in the order associated with the CD.

Alternatively, using the player menu, the user may select a particular piece of content, i.e., a track, to play using the track up and track down user interfaces. In this case, the programmed play order is bypassed in favor of the users selection. Again, once a piece of content is selected, the system software causes the central server 16 to access the track from the central database 18 and to transmit the track to the user interface 22.

In one embodiment of the system, content is transmitted by downloading a copy of the content to the associated client system 20. The client system 20 then outputs the content to the associated user interface 22 through a communications line 24. In another embodiment of the system, content is transmitted by streaming the content, via the client system 20, to the user interface 22.

With reference to FIG. 6, the CD player includes a link to a content history menu through "The Store" interface button. At step S8, upon activation of the interface button, the system provides a content history menu (FIG. 7) to the user interface 22. In accordance with the ancillary data associated with the CD selected by the user, the history menu provides the user with a historical record of CDs selected and played by the system for the particular user during a particular session. This history includes the title and artist of the CDs and an indication of their availability for purchase. In one configuration, if a CD is available for purchase through the system a selectable box is presented to the user. If a CD is not available for purchase a circle with a line through it is presented.

Figure 7:
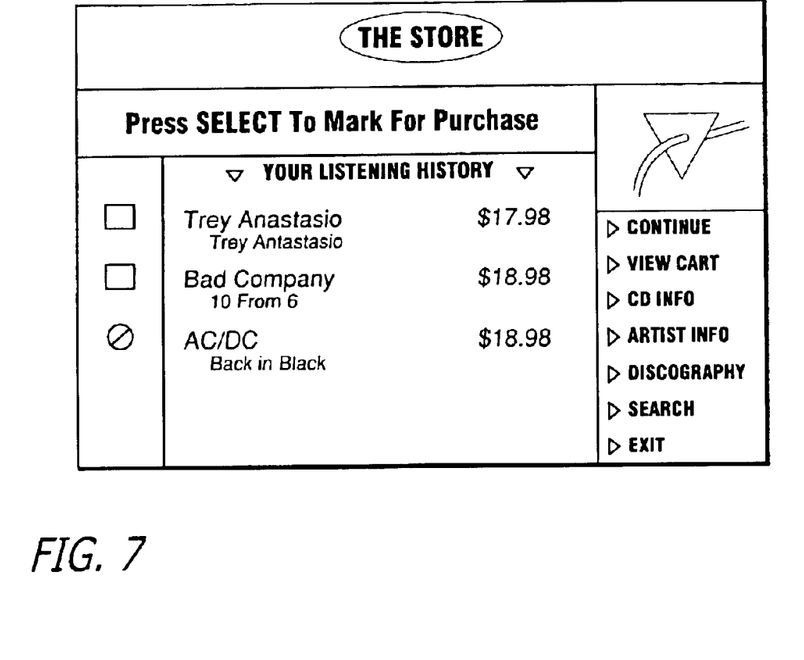
FIG. 7 is an exemplary content history menu provided by the central server to the user interface upon activation of The Store button of FIG. 6.
Figure 8:
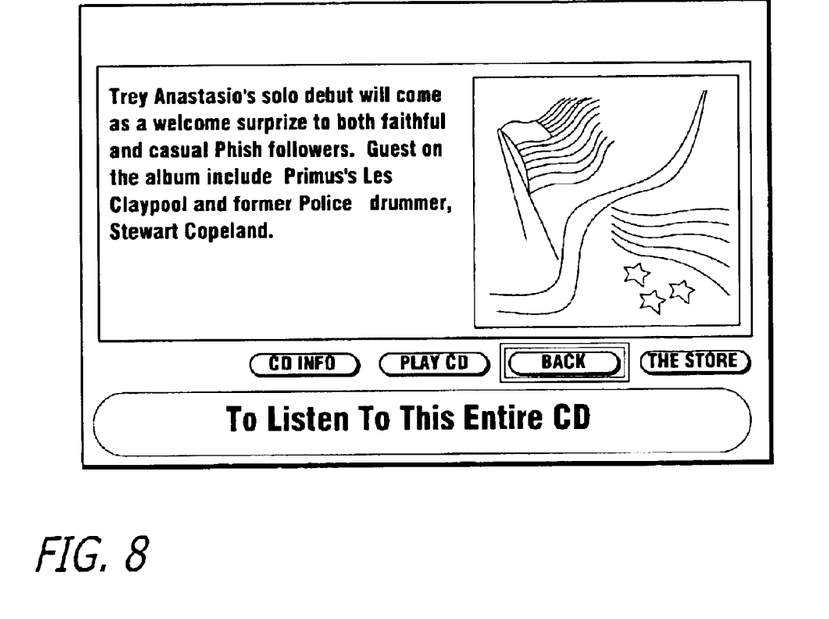
FIG. 8 is an exemplary CD information menu provided by the central server to the user interface upon selection of the CD info button of FIG. 7.

From the listening history menu, the user may select a particular CD from the history list using the interface device and view additional ancillary information by further selecting "CD info," "Artist info" and "Discography." For example, upon selection of the CD Trey Anastasio and selection of "CD info", the system would present a screen (FIG. 8) to the user interface system that includes a short review of the CD.

Figure 9:
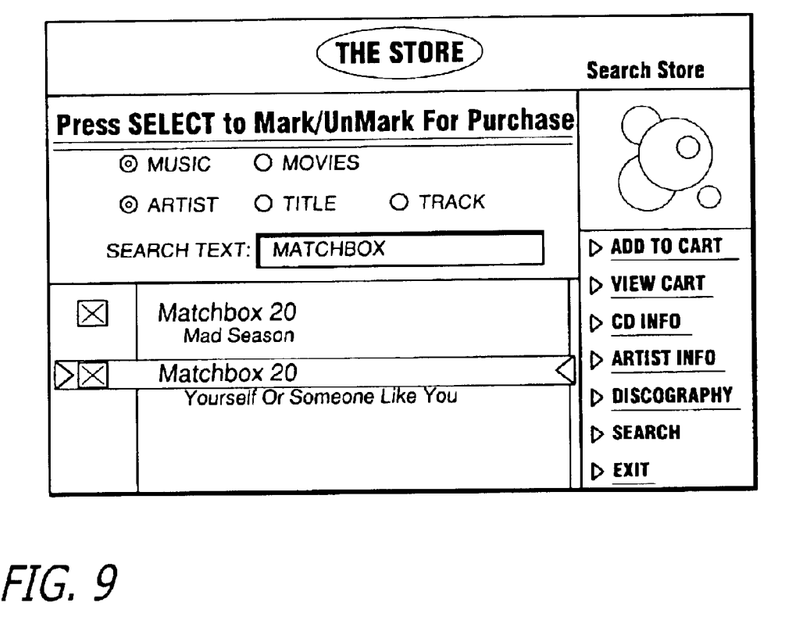
FIG. 9 is an exemplary search menu provided by the central server to the user interface upon selection of the Search button of FIG. 7.

The listening history menu also provides access to a system search engine through selection of the "Search" button. Upon activation of the "Search" button, the system presents a search menu (FIG. 9) to the user interface system. Through the menu, the user may search the system for content by type, e.g., music and movies, and artist, title or track text search. Content which satisfies the search criteria is presented to the user interface system along with an indication of its purchase availability.

Figure 10:
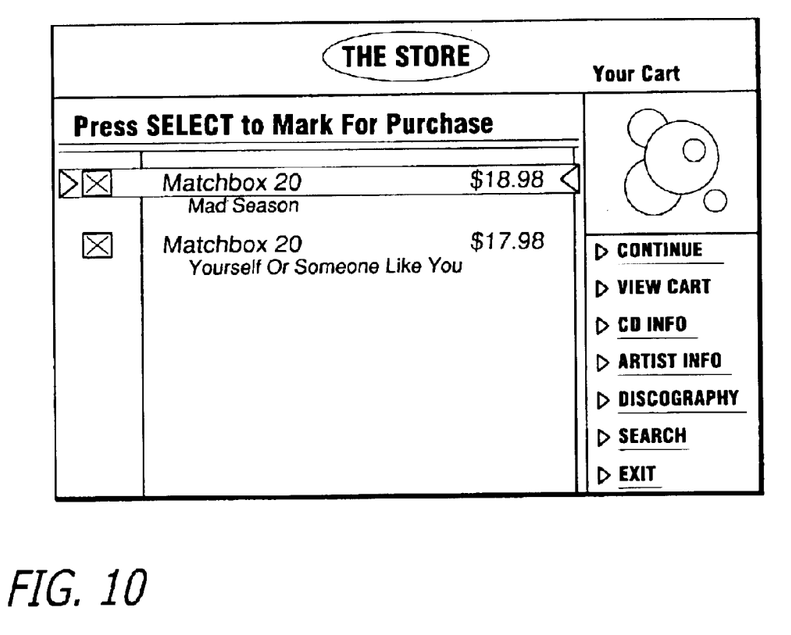
FIG. 10 is an exemplary cart menu provided by the central server to the user interface upon selection of the View Cart button of FIG. 7.
Figure 11:
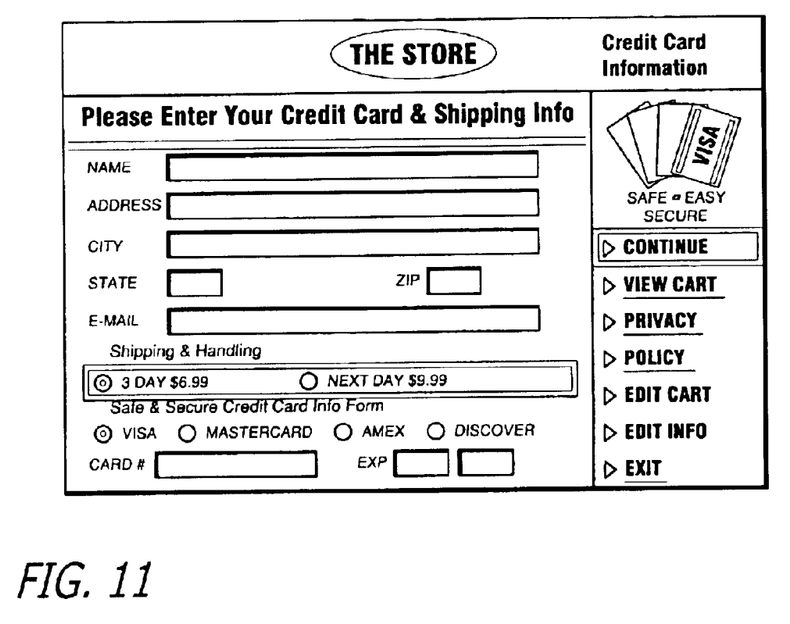
FIGS 11 and 12 are exemplary credit card information and confirmation menus provided by the central server to the user interface upon selection of the Continue button of FIG. 10.
Figure 12:
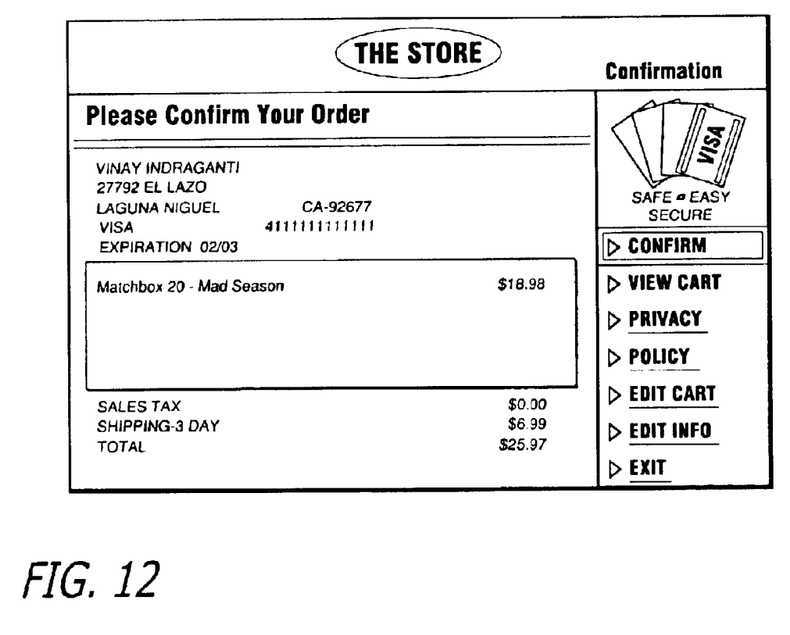

After selecting one or more CDs for purchase, the user may view his shopping cart by selecting the "View Cart" button. Upon selection of the "View Cart" button, the system presents a cart screen (FIG. 10) to the user interface system. From the cart screen, the user may place an order for the selected CDs through the "Continue" button. Upon activation of the "Continue" button, the system presents credit card information and confirmation screens (FIGS. 11 and 12) through which the user completes his purchase.

Figure 13:
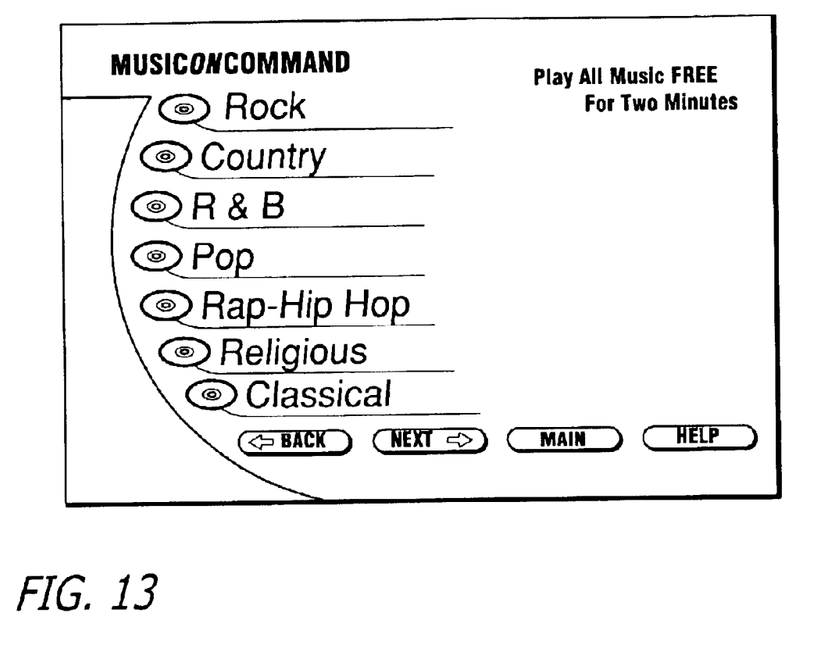
FIG. 13 is an exemplary category menu provided by the central server to the user interface upon selection of the Radio Interactive mode provided by the main menu of FIG. 3.
Figure 14:
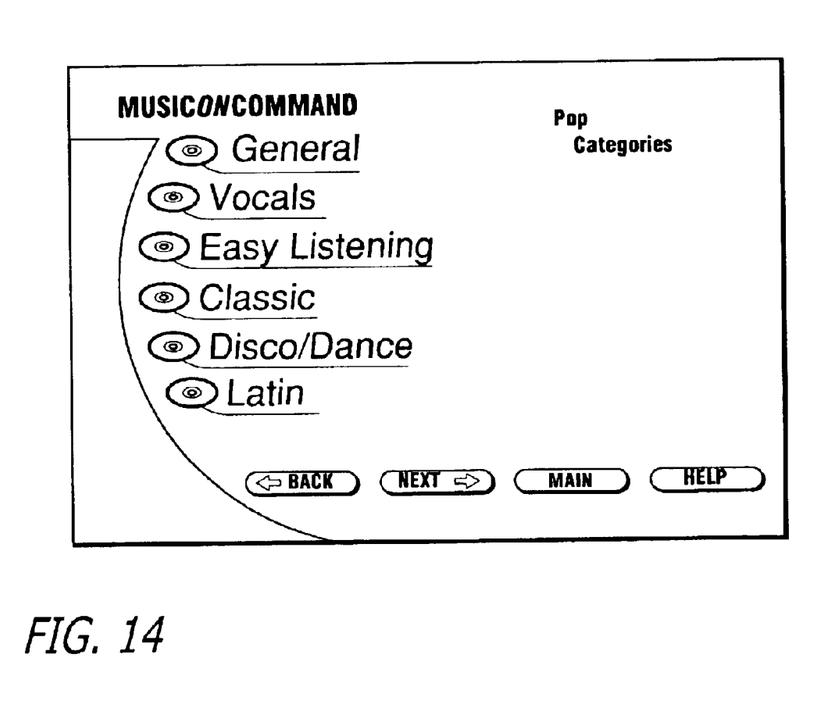
FIG. 14 is an exemplary sub-category menu provided by the central server to the user interface upon selection of a category from the menu of FIG. 13.
Figure 15:
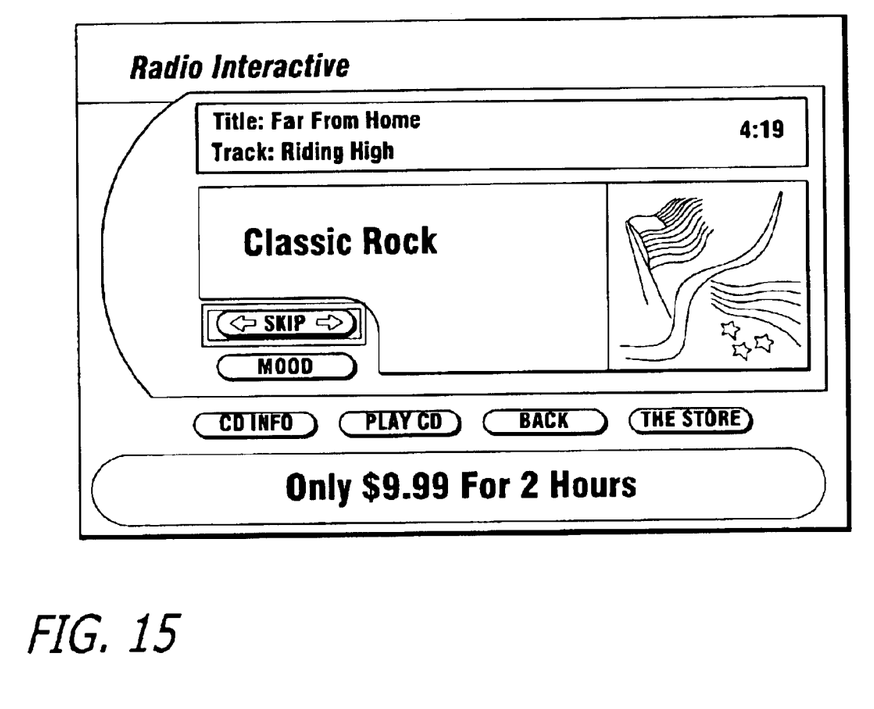
FIG. 15 is an exemplary player made available to the user interface upon selection of a sub-category from the menu of FIG. 14.

With continued reference to FIG. 2, if a user enters the Radio Interactive aspect of the system, the system software sends a category menu screen (FIG. 13) to the user interface 22. At step S9, the user may select one of the categories presented. Upon selection of a category, the system software sends a sub-category menu screen (FIG. 14) to the user interface. At step S10, the user may then select a style of music. At step S11, the user is then presented with a Radio Interactive player menu (FIG. 15).

Through the player menu the user may listen to the content associated with the programmed radio station in the play list order. In this case, the system software causes the central server 16 to access each piece of content associated with the play list from the central database 18 and to transmit the content to the user interface 22.

Alternatively, using the player menu, the user may select a particular piece of content, i.e., a track, to play using the track up and track down user interfaces. In this case, the programmed play list order is bypassed in favor of the users selection. Again, once a piece of content is selected, the system software causes the central server 16 to access the track from the central database 18 and to transmit the track to the user interface 22.

The Radio Interactive feature of the system also provides a content history menu (S12) to the user interface. The content history menu presents a list of content listened to including artist and title and one or more CDs on which the track is available. The content list provides an indication of the availability for purchase of the content, including the individual pieces of content and the CDs containing the content.

The system may include a criteria for determining which content are included in the content history display. For example, a user may skip certain tracks from the programmed play list or may listen to certain tracks only for a short amount of time. Such actions by the user serve as an indication of the user's disinterest in the track. Accordingly, the system may be programmed to only include tracks in the history list that are played for a predetermined amount of time, such as, for example, 60 seconds.

As previously described with respect to the CD Jukebox feature of the system, additional information on content may be obtained through various interfaces and content may be purchased through the purchase interface. The purchase of the media may comprise purchasing the entire CD, from which the track was taken, or just the purchase of the track itself. A CD purchase may be completed by credit card. A single track purchase may be completed by downloading a copy of the track through an output port of the interface device (not shown) of the user interface 22 into a memory device (not shown) attached to the output port by the user.

It will be apparent from the foregoing that, while particular forms of the invention have been illustrated and described, various modifications can be made without departing from the spirit and scope of the invention. Therefore, it is not intended that the invention be limited, except as by the appended claims.

What is claimed is:

1. A system for providing electronic media content to any one of a plurality of users, said system comprising:
    a plurality of user interfaces each having a video monitor, an input device, speakers and an interface device;
    a central database having a plurality of content stored therein, each content having ancillary data associated therewith, the ancillary data also stored in the database; and
    a server interfacing with both the user interfaces and the central data base over communication lines, the server programmed to:
        present to the video monitor a selection menu through which a compilation may be selected, the compilation comprising a plurality of content in a specified order;
        in response to a selection of a compilation, present to the video monitor a player menu through which the compilation may be played and one or more of the plurality of content associated with the compilation may be selected for individual playing, the player menu including a history menu link;
        in response to user interaction with the player, access the content for playing through the user interface; and
        in response to linking to the history menu, present to the video monitor a history menu comprising data indicative of the content that has been played by the player in response to user interaction with the player and the ancillary data associated with that content.

2. The system of claim 1 wherein the ancillary data comprises the title of the played content.

3. The system of claim 1 wherein the ancillary data comprises an indication of the purchase availability of the played content.

4. The system of claim 1 where the history menu provides data only for content that is played by the player for a predetermined amount of time based on user interaction with the player menu.

5. The system of claim 1 wherein history menu comprises a link to a search menu by which the content data base may be searched.

6. The system of claim 1 wherein the compilation has a programmed playlist order and the player menu comprises at least one of a content up user interface and a content down user interface through which the user may bypass the programmed playlist order and select individual content for playing.

7. The system of claim 1 wherein the server is further programmed to present the player menu for a specific time duration and the history menu includes only the data associated with the content that has been played during that time.

8. The system of claim 1 wherein the ancillary data comprises the artist of the played content.

9. The system of claim 8 wherein the ancillary data comprises information on the artist.

10. The system of claim 1 wherein the history menu provides an interface through which purchasable content may be purchased.

11. The system of claim 10 wherein the interface comprises a selection interface by which content to purchase may be selected.

12. The system of claim 1 wherein the ancillary data comprises the title of one or more content compilations with which the played content is associated.

13. The system of claim 12 wherein the ancillary data comprises an indication of the purchase availability of the one or more content compilations.

14. The system of claim 12 wherein the ancillary data comprises information on the one or more content compilations.

15. A method of providing electronic media content to any one of a plurality of user interfaces each having a video monitor, an input device, speakers and an interface device, the content stored in a central database, each content having ancillary data associated therewith, the ancillary data also stored in the database said method comprising:
    presenting to the video monitor a selection menu through which a compilation may be selected, the compilation comprising a plurality of content in a specified order;
    in response to a selection of a compilation, presenting to the video monitor a player menu through which the compilation may be played and one or more of the plurality of content associated with the compilation may be selected for individual playing, the player menu including a history menu link;

in response to user interaction with the player, accessing the content for playing through the user interface; and in response to linking to the history menu, presenting to the video monitor a history menu comprising data indicative of the content that has been played by the player in response to user interaction with the player and the ancillary data associated with that content.

16. The method of claim 15 wherein the ancillary data comprises the title of the played content.

17. The method of claim 15 wherein the ancillary data comprises the artist of the played content.

18. The method of claim 15 wherein the ancillary data comprises an indication of the purchase availability of the played content.

19. The method of claim 15 wherein the ancillary data comprises the title of one or more content compilations with which the played content is associated.

20. The method of claim 15 wherein the player menu is presented for a specific time duration and the history menu includes only the data associated with the content that has been played during that time.

* * * * *